United States Patent
Kashani-Shirazi et al.

(10) Patent No.: US 8,119,554 B2
(45) Date of Patent: Feb. 21, 2012

(54) USE OF SHAPED BODIES HAVING CATALYTIC PROPERTIES AS REACTOR INTERNALS

(75) Inventors: Nawid Kashani-Shirazi, Ilvesheim (DE); Veronika Wloka, Mannheim (DE); Wolfgang Gerlinger, Limburgerhof (DE); Andrea Schmidt, Ludwigshafen (DE); Kerstin Heinen, Lorsch (DE); Wolfgang Kollenberg, Brühl (DE)

(73) Assignee: BASF SE, Ludwigshafen (DE)

( * ) Notice: Subject to any disclaimer, the term of this patent is extended or adjusted under 35 U.S.C. 154(b) by 129 days.

(21) Appl. No.: 12/681,998

(22) PCT Filed: Sep. 26, 2008

(86) PCT No.: PCT/EP2008/062956
§ 371 (c)(1),
(2), (4) Date: Apr. 7, 2010

(87) PCT Pub. No.: WO2009/047141
PCT Pub. Date: Apr. 16, 2009

(65) Prior Publication Data
US 2010/0222209 A1    Sep. 2, 2010

(30) Foreign Application Priority Data

Oct. 8, 2007  (EP) .................................... 07118050

(51) Int. Cl.
B01J 31/00 (2006.01)
B01J 21/00 (2006.01)
B28B 1/00 (2006.01)
B28B 3/00 (2006.01)
B28B 5/00 (2006.01)
B29B 17/00 (2006.01)
B29C 63/00 (2006.01)
B29C 65/00 (2006.01)
B29C 69/00 (2006.01)
B29C 71/00 (2006.01)
C04B 33/32 (2006.01)
C04B 33/36 (2006.01)
C04B 35/64 (2006.01)

(52) U.S. Cl. ........ 502/159; 502/240; 502/524; 502/525; 502/527.11; 502/527.12; 502/527.13; 264/241; 264/345; 264/650; 264/651; 264/681

(58) Field of Classification Search .................. 502/159, 502/240, 524, 525, 527.11, 527.12, 527.13; 264/241, 345, 650, 651, 681
See application file for complete search history.

(56) References Cited

U.S. PATENT DOCUMENTS

| | | | |
|---|---|---|---|
| 4,017,347 A | 4/1977 | Cleveland | |
| 5,398,193 A * | 3/1995 | deAngelis | .................... 700/119 |
| 2005/0016830 A1 | 1/2005 | Kaibel et al. | |
| 2005/0017394 A1 | 1/2005 | Hochsmann et al. | |
| 2005/0070733 A1 | 3/2005 | Sigl et al. | |
| 2008/0248344 A1 * | 10/2008 | Schmitt et al. | .................. 429/17 |
| 2011/0030440 A1 * | 2/2011 | Keane et al. | .................... 72/274 |

FOREIGN PATENT DOCUMENTS

| | | | |
|---|---|---|---|
| DE | 672655 | | 3/1939 |
| DE | 2709003 A1 | | 9/1977 |
| EP | 0431924 A2 | | 6/1991 |
| EP | 0805146 A1 | | 11/1997 |
| WO | 01/12312 | * | 2/2001 |
| WO | WO-03/047747 A1 | | 6/2003 |
| WO | WO-2004112988 A2 | | 12/2004 |
| WO | WO-2006045744 A1 | | 5/2006 |

OTHER PUBLICATIONS

"High solids loading ceramic colloidal dispersions in UV curable media via comb-polyelectrolyte surfactants," Yoram De Hazan et al. Journal of Colloid and Interface Science 337 (2009), pp. 66-74.*
"Rapid prototyping technique for ceramic mini-devices containing internal channels with asymmetrical contour," R. F. Louh et al. Journal of the European Ceramic Society 30 (2010), pp. 2841-2847.*
Stringaro J.-P. et al.: "Catalysts for heterogeneous reaction systems," Chemical plants and processing, Jul. 1992, pp. 6-10.
Knitter R., Göhring et al.: "Microfabrication of ceramic microreactors," Microsystem Technologies, vol. 7, pp. 85-90, 2001.
Bauer W., Knitter R.: "Development of a rapid prototyping process chain for the production of ceramic microcomponents," J. of Materials Sciences, vol. 37, pp. 3127-3140, 2002.
Knitter R., Liauw M.A.: "Ceramic miroreactors for heterogeneously catalysed gas-phase reactions," Lab Chip, vol. 4, pp. 378-383, published on the wev May 3, 2004.
R. Knitter et al., "Keramische Reaktoren für den Einsatz in der Mikroreaktionstechnik," Galvanotechnik Jan. 2004, pp. 196-204.
Alm B. et al.: "Development of a ceramic micro heat exchanger—Design, Construction and Testing," Chem. Eng. Technol., vol. 28, No. 12, pp. 1554-1560, 2005.
Schmitt C. et al.: "Ceramic plate heat exchanger for heterogeneous gas-phase reactions," Chem. Eng. Technol., vol. 28, No. 3, pp. 337-343, 2005.
Kaufmann U. et al.: "Free Form Fabrication—InkJet Printing Verfahren zur Herstellung von 3D-Keramikbauteilen," CFI/Ber 82 (2005) No. 13, pp. 99-103.
English-language translation of International Preliminary Report on Patentability (Chapter II) for PCT/EP2008/062956, issued Jul. 23, 2010.

* cited by examiner

Primary Examiner — Patricia L Hailey
(74) Attorney, Agent, or Firm — Connolly Bove Lodge & Hutz LLP

(57) ABSTRACT

Shaped bodies having catalytic properties which can be obtained by a process comprising the steps:
 a) production of a shaped body by means of a powder-based rapid prototyping process,
 b) if appropriate, a heat treatment of the shaped body,
 c) if appropriate, application of at least one catalytically active component to the shaped body,
 d) if appropriate, a further heat treatment,
 where steps b), c) and/or d) can be carried out a number of times,
are used as reactor internals in heterogeneously catalyzed chemical reactions.

20 Claims, 2 Drawing Sheets

USE OF SHAPED BODIES HAVING CATALYTIC PROPERTIES AS REACTOR INTERNALS

CROSS REFERENCE TO RELATED APPLICATIONS

This application is a National Phase filing under 35 U.S.C. §371 of PCT/EP2008/062956 filed Sep. 26, 2008, which claims priority to Patent Application No. 07118050.9, filed in Europe on Oct. 8, 2007. The entire contents of each of the above-applications are incorporated herein by reference.

The invention relates to the use of shaped bodies having catalytic properties as reactor internals in heterogeneously catalyzed chemical reactions.

BACKGROUND TO THE INVENTION

Heterogeneous catalysis plays a central role in the modern chemical industry. Heterogeneous catalysts frequently comprise metals and/or metal oxides with whose surface the reactants in the reaction to be catalyzed interact. Apart from the nature of this interaction, the transport of the reactants to the active sites of the surface and the removal of the products from the surface play a critical role. In addition, the heat of reaction liberated has to be removed as quickly as possible or required heat has to be introduced.

Physical Forms of Catalysts

Owing to the wide variety of heterogeneously catalyzed reactions and the sometimes very different reaction conditions, various physical forms have become established for heterogeneous catalysts with the intention of ensuring optimal mass transfer and heat transport for the respective reaction. In beds, the catalyst is present in a disordered arrangement in the reactor, while in a packing it is installed in an aligned and ordered manner in the reactor. The use of catalysts in the form of granules, extrudates, pellets, rings or crushed material which are introduced as a bed into the reactor is most widespread. Such shaped bodies can either fill the entire reactor space or be arranged in various stages within the reactor by means of spacers. Additional mixing devices, heat exchangers or other internals can be provided at the reactor inlet or at other places in the reactor. To optimize the yield of desired product, various catalyst beds (e.g. different physical forms, catalysts having different amounts of active component or having different dopants) can be used along the flow direction. However, this way of using catalysts has the disadvantage that the beds described generally lead to a high pressure drop in the reactor. In addition, formation of channels or formation of zones having stagnating gas and/or liquid movement can easily occur, so that the catalyst is exposed to the reactants only very unevenly. Furthermore, the removal and installation of the shaped bodies which is required when the catalyst is replaced can be very complicated, for example in the case of shell-and-tube reactors or salt bath reactors having a large number of tubes.

To reduce the pressure drop, reactor internals which are intended to prevent excessively dense packing of the catalyst in the reactor have been described. WO 03/047747 describes a multichannel packing which is made of metal and in which a plurality of layers of packing having a different geometric surface area are assembled alternately and the catalyst is introduced between these. The layers of packing are selected so that the catalyst can trickle only into the channels of the packing having a low specific surface area, known as the catalyst channels. The catalyst cannot trickle into the layers having a high specific surface area for geometric reasons. This system is employed inter alia in reactive distillation. A disadvantage is that, owing to the increased porosity of the packing, a relatively large reactor volume is required and the internals offer a large metallic surface area. Additional metal in the form of the packing is required, which leads to increased materials costs. Furthermore, corrosion can occur and metal ions can be dissolved.

Catalysts which cannot be used as a bed of shaped bodies because of their small size can frequently be used by installation in permeable containers, for instance in woven mesh pouches. Such pouches comprise a wire mesh (e.g. KATAPAK® K from Sulzer AG, CH-8404 Winterthur, cf. J. P. Stringaro et al., Chemical Plants and Processing 1992, July, pp. 6 to 10) and are used as catalytically active internals in reactive distillations. Further designs are offered by Montz and CDTech and function according to a similar principle (e.g. "bales" from CDTech, Houston, USA). The use of these, packings has the disadvantage that in processes in which the catalyst is surrounded by a gas/liquid mixture, the appropriate liquid trickle density has to be adhered to exactly, which proves to be difficult in practice. This leads, when liquid flows are too high, to flow over the catalyst pouches, while a liquid flow which is too low leads to "drying out" of the catalyst.

For particular applications, catalysts can also be used in the form of monoliths having continuous channels, honeycomb or rib structure, as are described, for example, in DE-A-2709003. Monoliths offer a very low pressure drop at the expense of transverse mixing. This can in practice lead to inhomogeneous distribution of concentrations, temperatures and flow velocities and also unsatisfactory radial heat dispersion. The low ratio of catalyst (support) space mass to reactor volume is usually a disadvantage. Despite the disadvantages described, the physical form of a monolith has become established in exhaust gas catalysts because of a lack of better alternatives for motor vehicles.

There is therefore a need for shaped bodies having catalytic properties which can be used as reactor internals and have a geometry which is optimized for the respective reaction conditions. They should if possible allow high transverse mixing, i.e. equalization of concentrations and temperatures in the reactor, and only slight backmixing and sufficiently high mass transfer and heat transport and lead to only a very small pressure drop and conduct a way or introduce any positive or negative heat of reaction which may occur.

Manufacturing Process "Rapid Prototyping"

A person skilled in the art will know a manufacturing process known as "rapid prototyping" (RP) for prototype components by means of which even very intricate workpieces of virtually any geometry can be produced directly and quickly with the aid of available CAD data with virtually no manual procedures or molds. The principle of rapid prototyping is based on the layer-wise construction of components utilizing physical and/or chemical effects. Numerous processes such as selective laser sintering (SLS) or stereolithography (SLA) have become established here. The processes per se differ with regard to the material by means of which the layers are built up (polymers, resins, paper sheets, powders, etc.) and the method by means of which these materials are joined (laser, heating, binders or binder systems, etc.). The processes are described in numerous publications.

One of the rapid prototyping processes is described in EP-A0431 924 and comprises the layer-wise buildup of three-dimensional components from powder and binder. Powder which has not been bound is removed at the end and the workpiece having the desired geometry remains.

It is known from WO 2004/112988 that more than one pulverulent starting material can also be used, and US 2005/0017394 discloses the use of activators which induce curing of the binder.

In, for example, Galvanotechnik 1/2004, pp. 196 to 204, R. Knitter et al. describe ceramic reactors for use in microreactor technology. Shaping is effected by means of a rapid prototyping process chain, but with insertion of additional intermediate steps, namely 1.) producing a silicone negative mold from the original plastic model obtained by stereolithography and then 2.) using this mold for filling with a ceramic slip in low-pressure injection molding. The ceramic microreactors obtained serve, inter alia, as catalyst supports to which the actual catalysts are applied, for example as a suspension. The disadvantage of this production process is the additional process step in which the negative mold is firstly produced before final production occurs in the form of casting.

In cfi/Ber. DKG 82 (2005) no. 13, pp. 99 to 103, U. Kaufmann et al. describe the production of 3D ceramic components by means of a process which is based on the layer-wise buildup of the components in a powder bed. Possible uses of these components as implants are discussed.

OBJECT AND SUBJECT MATTER OF THE INVENTION

It was an object of the present invention to improve the use of catalysts in heterogeneously catalyzed chemical reactions and to avoid the abovementioned disadvantages of known catalysts. When the catalysts are used, it should be possible to achieve a low pressure drop compared to beds, preferably very high transverse mixing compared to also only a little backmixing counter to the flow direction and sufficiently high mass transfer and heat transport, including radial heat transport.

The present invention therefore provides for the use of shaped bodies having catalytic properties which can be obtained by a process comprising the steps:
 a) production of a shaped body by means of a powder-based rapid prototyping process,
 b) if appropriate, a heat treatment, preferably sintering and/or calcination of the shaped body,
 c) if appropriate, application of at least one catalytically active component to the shaped body,
 d) if appropriate, a further heat treatment,
 where steps b), c) and/or d) can be carried out a number of times,
as reactor internals in heterogeneously catalyzed chemical reactions.

The binder or binder mixture is preferably selected so that the binder itself or its residues do not affect or do not adversely affect the chemical reaction during later use as catalyst (support).

According to the invention, the object is therefore achieved by the use of shaped bodies which have catalytic properties and whose geometry is optimized for the respective flow and reaction conditions in the reactor. The reactor internals can be tailored to the required reaction conditions, which is not possible by means of conventional techniques such as extrusion or injection molding. The advantage of the rapid prototyping technology compared to these conventional manufacturing techniques is that theoretically any desired geometry, including complex components having, for example, hollow spaces or microchannels, can be converted with the aid of computer control using a CAD data set into the corresponding three-dimensional component without a prior production of negative casting molds, without cutting, milling, grinding, soldering, etc. This makes it possible to produce reactor internals which, owing to their optimized geometry, offer advantages over conventional reactor internals in terms of mass transfer and heat transport in chemical reactions. This process intensification results in higher yields, conversions and selectivities and reliable reaction conditions and can, as a result of reduced apparatus sizes or reduced amounts of catalyst, lead to cost savings for existing or new processes in the chemical industry.

DESCRIPTION

Figure 1:
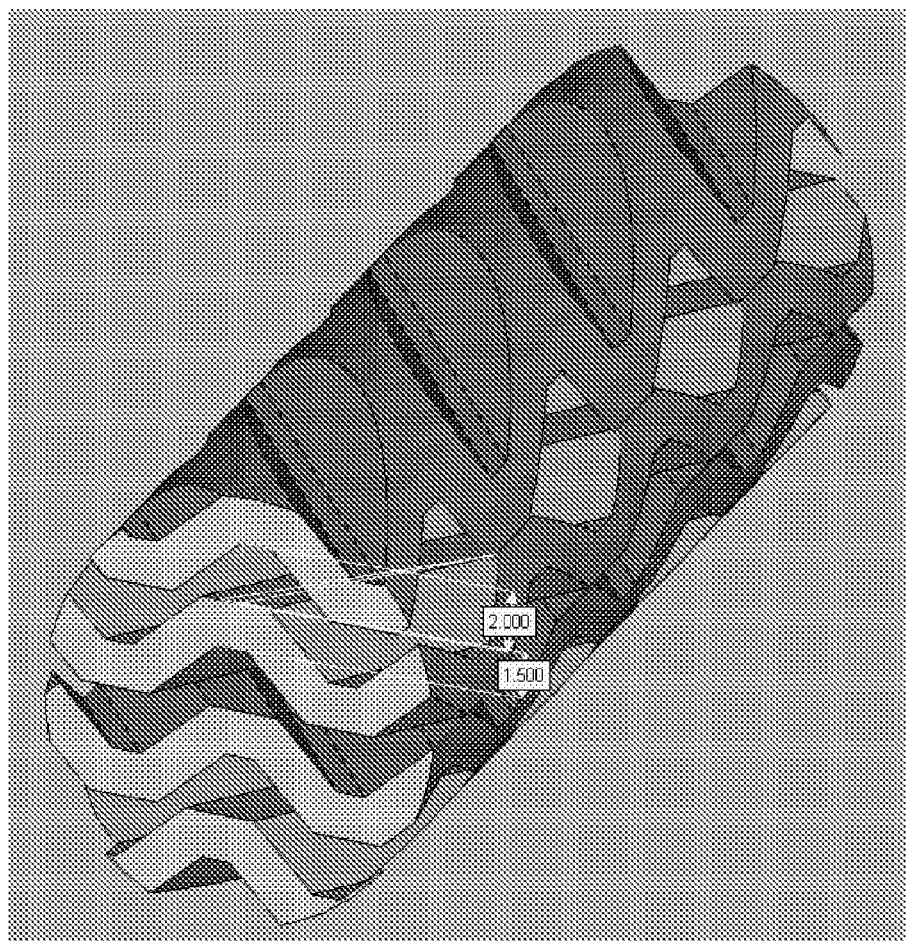
FIG. 1 shows a three-dimensionally structured "cross-channel structure" that was produced from $\alpha$-$Al_2O_3$.

The shaped bodies to be used according to the invention acquire their catalytic properties either by being produced from a catalytically active material or a precursor thereof or as a result of comprising an inert material (which serves as support) onto which a catalytically active component is applied (see process step c). It is also possible for further catalytically active components, for example metals or promoters, to be applied to material which is already catalytically active.

Materials

Suitable materials for producing the shaped bodies to be used according to the invention are preferably metal oxides, metal oxide hydroxides, hydrotalcites, spinels, perovskites, metals, alloys, metal phosphates, naturally occurring and synthetic layer or framework silicates such as clay minerals, zeolites, mica, feldspars, ceramic materials such as steatite, cordierite, porcelain, carbides such as SiC, $B_4C$, nitrides such as $Si_3N_4$, AlN, glasses and the like. Preferred materials are silicon dioxide, aluminum oxide, titanium dioxide, zirconium dioxide, magnesium oxide, calcium oxide, mixed metal oxides, hydrotalcites, spinels, perovskites, metal phosphates, silicates, zeolites, steatite, cordierite, carbides, nitrides or mixtures or blends thereof. Particular preference is given to silicon dioxide, aluminum oxide, titanium dioxide, zirconium dioxide, magnesium oxide, calcium oxide, steatite, cordierite and mixed oxides such as $SiO_2$—$Al_2O_3$, ZnO—$Al_2O_3$—CuO, $SiO_2$—$TiO_2$, $ZrO_2$—$SiO_2$, $ZrO_2$—$Al_2O_3$ or mixtures of two or more of these materials. If the materials used exist in a plurality of modifications, the various modifications can be used individually or in admixture, and phase changes can also occur as a result of the thermal treatment which may be carried out in the production process. Examples of materials which can be used and have various known modifications are $\alpha$-$Al_2O_3$, $\gamma$-$Al_2O_3$, $\theta$-$Al_2O_3$, monoclinic $ZrO_2$, cubic $ZrO_2$, tetragonal $ZrO_2$, $TiO_2$ having the rutile structure, $TiO_2$ having the anatase structure, $SiO_2$ in a number of stable or metastable modifications, e.g. $\alpha$- and $\beta$-quartz, $\alpha$- and $\beta$-cristobalite, $\alpha$- and $\beta$-tridymite, etc.

Powder Form

Pulverulent starting materials are used in the rapid prototyping process to be used according to the invention and can be used with or without binders. The further information applies to both variants. It is possible to use both monodisperse and polydisperse powders. When relatively fine particles are used, it is naturally possible to achieve thinner layers, as a result of which a larger number of layers and thus a greater spatial resolution is possible in building up a desired shaped body than when coarser particles are used. Preference is given to powders having an average particle size in the range from about 0.5 μm to about 450 μm, particularly preferably from about 1 μm to about 300 μm and very particularly preferably from 10 to 100 μm. The powder used can, if necessary, also be pretreated in a targeted manner, e.g. by means of at least one of the steps calcination, compacting, mixing, granulation, sieving, agglomeration or milling to a particular particle size fraction.

Production

The rapid prototyping process to be used according to the invention comprises, as is known, the following steps which are repeated until the desired shaped body has been built up completely from the individual layers. A pulverulent starting material or starting material mixture is applied in a thin layer to a substrate and subsequently admixed at selected places on this layer with a binder and any auxiliaries required or is irradiated or treated in another way so that the powder is bonded at these places, as a result of which the powder is bound both within the layer and also to the adjoining layers. After this procedure has been repeated as often as necessary for the desired shape of the workpiece to have been reproduced completely in the powder bed formed, the powder which has not been bound by the binder is removed to leave the bound powder in the desired shape.

Binders and Auxiliaries

As binder, it is generally possible to use any material which is able to join adjacent particles of the pulverulent starting material firmly to one another. Preference is given here to sols or colloidal solutions of silicon dioxide or aluminosilicates, silica or silicic esters, siloxanes or silicones. Further suitable binders are organic materials, in particular ones which can be crosslinked or can undergo covalent bonding with one another in another way, for example phenolic resins, polyisocyanates, polyurethanes, epoxy resins, furan resins, urea-aldehyde condensates, furfuryl alcohol, acrylic acid dispersions and acrylate dispersions, polymeric alcohols, peroxides, carbohydrates, sugars, sugar alcohols, proteins, starch, carboxymethylcellulose, xanthan, gelatin, polyethylene glycol, polyvinyl alcohols, polyvinylpyrrolidone or mixtures thereof. The binders are used in liquid form either as solutions or dispersions, with both organic solvents (e.g. toluene) and water being able to be used. Preference is given to using binders which themselves or as their residues do not affect or do not adversely affect the chemical reaction in the later use as catalyst (support).

The binders are applied, for example, by means of a nozzle, a pressure head or another apparatus which allows precise positioning of very fine droplets of the binder on the powder layer. The weight ratio of powder to binder varies as a function of the substances used and is generally in the range from about 40:60 to about 99:1, preferably in the range from about 70:30 to about 99:1, particularly preferably in the range from about 85:15 to about 98:2.

If appropriate, it is also possible to use one or more auxiliaries which, for example, can have an influence on crosslinking of the binders or serve as hardeners. Auxiliaries used are, in particular, water, inorganic acids or bases and also rapidly hydrolyzable or condensable compounds such as metal alkoxides (e.g. titanium alkoxides). The auxiliaries can be applied separately or can, if appropriate, be added to the powder bed and/or to the binder or the binder solution.

Heat Treatment

In step b), the heat treatment can be in the form of sintering and/or calcination. The sintering or calcination is preferably carried out at temperatures in the range from 350 to 2100° C. The heat treatment can also be carried out by firstly carrying out binder removal and then carrying out the sintering and/or calcination. Definitions of sintering and calcination are given below.

Geometry of the Shaped Bodies

The geometry of the shaped bodies depends on the requirements of the respective field of use and can be varied within a wide range due to the flexibility of the powder-based rapid prototyping process. Preference is given to a shape which when used as catalyst in heterogeneously catalyzed chemical reactions leads to very high transverse mixing and to a very low pressure drop in the reactor and also to only low back-mixing counter to the flow direction and to sufficiently high mass transfer and heat transport, including heat transport to the surroundings. Advantageous shapes can, for example, be based on the packings having cross-channel structures which are known to those skilled in the art from distillation technology and are offered by manufacturers such as Montz, Sulzer or Kühni. These shaped bodies have channels through which the reaction medium flows; these channels are inclined to the main flow direction at an angle in the range from 0° to 70°, preferably from 30° to 60°. The channels can have any cross-sectional shape, with square, rectangular or round cross sections being preferred.

The packings can preferably be configured as multichannel packings which have channels in which the chemical reaction preferentially takes place and additionally comprise channels in which convective heat transport preferentially takes place. The channels for heat transport are preferably inclined at a greater angle and preferably have a hydraulic diameter which is 2-10 times the diameter of the channels for catalysis.

The multichannel packings are preferably manufactured with perforations in the individual layers, for example as expanded metal, to ensure better mass transfer.

However, monolithic structures having advantageously positioned holes and/or openings which connect the individual channels to one another and thus intensify transverse mixing also have decisive advantages over the existing shapes. Examples of such monoliths are described in detail in the article of Emitec (see Internet: http://www.emitec.com/index.php?lang=de&mid=d5&doc=s7). However, the structures described there have the disadvantage that the production process is suitable only for the production of metallic monoliths and not ceramic shapes. In addition, radial heat transport to the outside is problematical and bypass formation can occur as a result of the gap between monolith and reactor wall (or in the case of a plurality of monoliths through which flow occurs in parallel over the cross section, also between the monoliths).

Installation of the Shaped Bodies in Reactors

The shaped bodies used according to the invention are used as reactor internals. They can be present in unaligned form as a bed or in spatially aligned form, for example as packing in a column-shaped reactor, as is known in principle for monoliths. The shaped bodies used according to the invention can extend to the margin of the (column-shaped) reactor. The installation of the structured catalysts in the reactor can be carried out in various ways, e.g. in the case of a tube or shell-and-tube reactor by arrangement of the cylindrical components above one another. In this case, all catalyst parts do not necessarily have to have the same shape, structure, doping, etc, but a vertical/longitudinal segmentation is also possible: e.g. catalyst bodies having a low noble metal loading can be installed at the reactor inlet and a more noble metal can be provided on the structures in the direction of the outlet or vice versa. Components having different heat transport properties, etc, can also be installed over the length of the reactor. In addition, the catalyst bodies can also be installed in a segmented fashion in the transverse direction (e.g. in the case of pie segments by 4 quarter cylinders or by a number of hexagonal, honeycomb-like components which are arranged next to one another. The components can also be installed as a disordered bed.

Installation of the Shaped Bodies as a Bed

Conventional shaped bodies occasionally have a size which is so small that there is a risk of fluidization or of fracture or attrition. Shaped bodies according to the invention can be larger for otherwise the same catalytic, mass transfer and heat transport or pressure drop properties, so that the risk of fluidization can be eliminated when a bed of these shaped bodies is used.

Installation of the Shaped Bodies as Packing

The shaped bodies used according to the invention can also be used as reactor internals in spatially aligned form, for example as packing. Here, a reaction medium can flow through a column-shaped reactor comprising the shaped bodies as packings, with the packing consisting of one element or being made up of a plurality of elements which form packing sections arranged in the longitudinal direction, with each packing element being made up of a plurality of longitudinally aligned layers, each layer comprising closely packed channels, the channels of adjacent layers crossing and the channels within a packing element having lateral walls which are permeable or impermeable to fluids. It is also possible to use the shaped bodies described as a bed.

To suppress passage through the outer surface, the packings are preferably either a) equipped with a seal round the outside to ensure uniform flow over the entire cross section of the packing or b) preferably have a structure which does not have a relatively high porosity at the outer surface.

Examples of Geometries

Suitable shapes or structures of the shaped bodies used according to the invention are described, for example, in the following documents by the companies Montz and Sulzer. These structures can, according to the invention, be used in the form of ceramic materials as catalysts or catalyst supports. Mention may be made by way of example of the structures described in WO 2006/056419, WO 2005/037429, WO 2005/037428, EP-A-1 362 636, WO 01/52980, EP-B-1 251 958, DE-A-38 18 917, DE-A-32 22 892, DE-A-29 21 270, DE-A-29 21 269, CA-A-10 28 903, CN-A-1 550 258, GB-A-1 186 647, WO 97/02880, EP-A-1 477 224, EP-A-1 308 204, EP-A-1 254 705, EP-A-1 145 761, U.S. Pat. No. 6,409,378, EP-A-1 029 588, EP-A-1 022 057 and WO 98/55221.

An example of such a shaped body has, for example, a plurality of approximately vertically aligned corrugated plates or margins which are in contact along their lateral surfaces and whose closely spaced ribs run approximately in an arc from the top downward, with the ribs of two adjacent plates crossing one another and the ribs in the upper region of a plate being straight and oblique to the upper, in particular horizontal, edge of the plate and being curved in an arc in the lower region of the plate, the longitudinal line of the upper ends of the ribs forming an angle of from 30 to 70°, preferably from 45 to 60°, to the upper, in particular horizontal, edge of the plate, the longitudinal line of the lower ends of the ribs forming an angle of from 75 to 90°, preferably from 80 to 85°, with the lower, in particular horizontal, edge of the plate, with the longitudinal line being able to run in the same direction or the opposite direction of the ribs at the upper end. Such a design is described, for example, in EP-B-1 251 958 by Montz. It is also possible to provide ribs which are curved at the top and bottom, as are offered by, for example, Sulzer.

A further shaped body which is suitable for use as optimized reactor internal is in the form of a cross-channel packing made up of vertical layers which comprise corrugated or pleated metal oxides forming flow channels, with the flow channels of neighboring layers crossing one another in an open fashion and the angle between the channels which cross one another being less than about 100°. Such a cross-channel packing is described, for example, in EP-A-1 477 224; see also the definition of the angle there.

Examples of packings which can be used as shaped bodies are Sulzer BX mesh packings, Sulzer Mellapak lamella packings, high-performance packings such as Mellapak Plus, structured packings from Sulzer (Optiflow), Montz (BSH) and Kühni (Rombopak) and also packings from Emitec (www.emitec.com).

The shaped bodies can, for example, have the shape of the packing types A3, B1, BSH, C1 and M from Montz. Here, the packing bodies are made up of corrugated sheets (lamellae). The corrugations run at an angle to the vertical and form crossing flow channels with the adjacent lamellae.

Use in Reactions

The shaped bodies used according to the invention, e.g. shaped bodies as defined above, are preferably used in a reaction proceeding with absorption or evolution of heat, i.e. for endothermic or exothermic reactions. The reaction can be a liquid-phase reaction, gas-phase reaction or multiphase reaction, for example a three-phase reaction.

Production

The shaped bodies are produced as described above for rapid prototyping. Reference may be made to the literature cited above, also to Gebhardt, Rapid Prototyping, Werkzeuge für die schnelle Produktentstehung, Carl Hanser Verlag, Munich, 2000, J. G. Heinrich, New Developments in the Solid Freeform Fabrication of Ceramic Components, cfi/Ber. DKG 66 (1999), pages 29 to 35, R. Knitter, W. Bauer, Keramische Reaktoren für den Einsatz in der Mikroreaktor-Technik, Nachrichten-Forschungszentrum Karlsruhe 34 (2002), pages 143 to 152, A. Nagy, R. Lenk, Rapid Prototyping-Fertigungsverfahren für die schnelle Bereitstellung keramischer Funktionsmuster, in: Kriegesmann (Editor), Technische keramische Werkstoffe, 2004, ke 12/2005, pages 54 to 55; for criteria which apply in rapid prototyping, see also "Rapid Prototyping" in www.werkstoffzentrum.de.

After the shaped body has been manufactured, it is, if appropriate, subjected to a heat treatment which can be carried out in a plurality of stages or according to a temperature program or profile. In general, the thermal treatment is carried out in the range from about 300 to 2100° C. For example, the powder bed together with the shaped body located therein can firstly be heated to a temperature in the range from 300 to 700° C., preferably from 300 to 550° C. This is intended to complete the crosslinking of the binder, e.g. by hydrolysis and/or condensation with elimination of water or alcohols, and organic constituents can be at least partly removed by oxidation. This can be followed by a second temperature stage which generally comprises heating to a temperature of from 900 to 2100° C., preferably from 1100 to 1800° C. This is in the range of sintering where the powder particles become joined to one another and the mechanical strength of the shaped body is thus increased. Some shrinkage can occur during the sintering process and this has to be taken into account in the CAD model during printing. The powder which has not been bonded by the binder has to be removed at the latest before the sintering step, which can be effected, for example, by means of compressed air or blowing off. This leaves the bonded powder in the desired shape. The second temperature stage can be selected so that the resulting material has a high or low porosity. Depending on the requirements of the reaction to be catalyzed, mechanical stability, structure and porosity of the material can be optimized by means of this step.

In an embodiment of the invention, the shaped bodies produced are themselves catalytically active. In a further embodiment of the invention, the shaped bodies produced serve as supports for catalysts.

After the shaped body has been manufactured according to the invention, it can, if appropriate, be modified by application of at least one (further) catalytically active component. As such components can be, for example, metal salts, for instance hydroxides, nitrates, sulfates, halides, phosphates, acetates, oxalates or carbonates of elements such as iron, aluminum, copper, nickel, cobalt, chromium, vanadium, molybdenum, titanium, zirconium, manganese, zinc, palladium, rhodium, silver, gold, tungsten, platinum, bismuth, tin, potassium, sodium, cesium, calcium, barium, magnesium, selenium, antimony, lanthanum, cerium, yttrium, and the like. It is also possible to use mixtures of the salts. Ammonium salts, for example ammonium sulfate, phosphate, tungstate or vanadate, and also heteropolyacids or their salts, e.g. tungstophosphoric acid, molybdosilicic acid, etc, can also be used for modification. These catalytically active components can, for example, be applied by impregnating the shaped bodies with an aqueous and/or organic solution of the metal salts. If necessary, impregnation can be followed by another thermal treatment in which the metal salts applied are activated or decomposed. It is also possible to apply washcoats having compositions known to those skilled in the art by methods known to those skilled in the art after manufacture of the shaped body.

Use as Catalyst

The shaped bodies having catalytic properties which are obtained in this way can be used as reactor internals for many chemical reactions. It is generally possible to use all reactors which are operated using heterogeneous catalysts, for example fixed-bed tube reactors, moving-bed reactors, shell-and-tube reactors, salt bath reactors or fluidized-bed reactors, or reactors used in reactive distillation or reactive extraction. In general, all process engineering operations in which a reaction over a catalyst is involved are possible. Preference is given to reactors for continuous reaction.

According to the invention, the shaped bodies having catalytic properties can be used for any heterogeneously catalyzed chemical reactions, for example oxidations, ammoxidations, hydrogenations, dehydrogenations, isomerizations, hydrations, dehydrations, aminations, nitrations, alkylations, dealkylations, disproportionations, acylations, alkoxylations, epoxidations, esterifications, transesterifications, metathesis reactions, dimerizations, oligomerizations or rearrangements. They can be either single-phase gas or liquid reactions or multiphase reactions (e.g. gas-liquid or liquid-liquid reactions).

DEFINITIONS

The following definitions are important in relation to the present invention:

calcination is a heat treatment in which the organic constituents are removed from the body.

Sintering is a heat treatment in which adjacent powder particles become joined to one another.

The surface area per unit mass A is the surface area of the catalyst determined by nitrogen adsorption using the BET method in accordance with DIN-ISO 9277 or DIN 66131, based on its mass.

The surface area per unit mass is material-dependent and, in the case of catalysts used according to the invention, is in the range from 0.25 to 1500 $m^2/g$, preferably in the range from 0.5 to 1000 $m^2/g$ and particularly preferably in the range from 1 to 600 $m^2/g$.

To determine the external surface area $A_{particle, total}$, it is imagined that the internal free volume is filled with solid, i.e. only the surface of the particle or of the porous medium is considered. The external surface area is also referred to as geometric surface area.

In an analogous manner, the total particle volume $V_{particle, total}$ is the volume of the totality of all particles, with the internal free volume being regarded as filled with solid.

The total or bed volume $V_{bed}$ is the total volume of the porous medium. It is calculated by likewise imagining the external free volume to be zero, i.e. the bed is considered as solid material.

The external surface area per unit volume σ is the ratio of geometric or external surface area of the shaped catalyst bodies to the reactor volume.

$$\sigma = A_{particle, total}/V_{bed}$$

The external surface area per unit volume is, in the case of catalysts used according to the invention, preferably in the range from 1 to 10 000 $m^2/m^3$, particularly preferably from 10 to 5000 $m^2/m^3$ and in particular from 100 to 3000 $m^2/m^3$.

The porosity ε of a catalyst is the ratio of (total volume minus particle volume) to total volume.

$$\epsilon = (V_{bed} - V_{particle, total})/V_{bed}$$

The porosity is subdivided into two components. The external porosity is the volume of interstices between the various shaped bodies. In the case of shaped bodies having large free volumes within the shaped body, these free spaces likewise count as part of the external porosity. An example is the cylindrical volumes within ring-shaped catalyst bodies.

The internal porosity is defined as the volume of voids within a shaped body, which results from the shaped bodies not consisting entirely of solid material but comprising some free volumes. These free volumes within the particle can, for example, arise from the particles being composed of smaller primary particles.

The porosity is measured, for example, by means of mercury porosimetry in accordance with DIN 66133. The measurement gives a pore size distribution in the catalyst. At a very low gauge pressure, only the external porosity is measured.

In the case of the shaped bodies used according to the invention, the porosity is preferably from 10 to 99%, particularly preferably 20 to 90% and in particular from 25 to 75%.

The Sauter diameter $d_s$ is a measure of the dimensions of beds or generally of equivalent particles in porous media. It is defined as the ratio of six times the total volume $V_{particle, total}$ to the total geometric surface area $A_{particle, total}$ $$d_s = 6 * V_{particle, total}/A_{particle, total}$$

In the case of porous media, the Sauter diameter can generally be expressed more simply as $d_s = 6*(1-\epsilon)/\sigma$, where σ is the external surface area per unit volume.

The shaped bodies used according to the invention preferably have Sauter diameters in the range from 1 to 50 mm, particularly preferably from 1.5 to 15 mm, in particular from 1.5 to 5 mm.

The hydraulic diameter $d_h$ has its origin in a replacement model for flow cross sections having any shape. It is defined as the ratio of four times the cross-sectional area A to the circumference U or of four times the volume through which flow occurs $V=V_{bed}-V_{particle, total}$ to the surface area wetted by the fluid $A_{particle, total}$ $$d_h = 4*A/U = 4*V/A_{particle\ total}$$

A flow channel having any cross section can in this way be assigned a tube cross section having a diameter $d_h$. This tube cross section then has the same area to circumference ratio as the channel of any cross section. In the case of tubes having a circular cross section, for example, the internal tube diameter is equal to the hydraulic diameter.

If a fluid stream having local or localized concentration gradients flows through a bed, these gradients are decreased within the bed. This occurs firstly by molecular diffusion and secondly as a result of local turbulence which causes convective mass transfer. In addition, adhesion effects can lead to concentration equalization. The latter two effects are referred to as dispersion. While diffusion effects can be described by materials properties, dispersion properties are additionally dependent on flow velocity and bed properties. A distinction is made between radial and axial dispersion processes. Axial dispersion effects can be quantified by means of a residence time measurement. Radial dispersion (transverse mixing) is more difficult to determine. To measure this, a tracer gas can be added at a localized place, for example in the middle of the bed. The local concentration of the tracer then has to be determined at the end of the bed.

The Peclet number (Pe) is the dimensionless ratio of convective mass transfer or heat transport to the diffusive transport of heat or material. The Peclet number is a characteristic measure of backmixing or of the evening-out of concentration or temperature gradients in the axial direction. When the Peclet number becomes zero, the conditions in the geometry through which flow occurs correspond to an ideally mixed stirred tank, i.e. a completely backmixed system. As the Peclet number increases, the axial convective transport of heat or material becomes dominant over the dispersive effects and backmixing becomes less important in the system. The convective transport in the numerator of the Peclet number can be calculated from the diameter of the structure through which flow occurs. If a characteristic particle dimension is used instead of the diameter in the convective transport term, it is possible to define further dimensionless parameters, but their informative power with regard to axial backmixing remains identical to the parameter mentioned above.

The axial or radial Peclet number $Pe_{ax}$ or $Pe_{rad}$ is defined as the ratio of the product of the free initial flow velocity $u_0$ and the particle diameter $d_S$ to the axial or radial dispersion coefficient $D_{ax}$ or $D_{rad}$. It is a measure of the rate of convective and dispersive mass transfer processes.

$$Pe_{ax} = \frac{u_0 d_s}{D_{ax}},\ Pe_{rad} = \frac{u_0 d_s}{D_{rad}}.$$

The free initial flow velocity $u_0$ is the flow velocity averaged over the flow cross section in the imagined absence of the shaped body or bodies. The dispersion coefficients $D_{ax}$ and $D_{rad}$ are geometry- or bed-specific parameters which measure the dispersive mass transfer and heat transport properties of a structure through which flow occurs which are not caused by molecular diffusion processes.

In the case of the shaped bodies used according to the invention, the Peclet number can be in the range from zero to any greater value. In the case of a monodisperse bed of spheres, the axial Peclet number when molecular diffusion is negligibly low $Pe_{ax}=2$.

In addition to the mass transfer processes considered above, the outward or inward wall heat transport can also be considered. The wall heat transport represents an additional limitation. This is due to the greater porosity in the vicinity of the wall in beds compared to the interior of the bed which is remote from the wall.

For the purposes of the invention, the main flow direction indicates the direction in which the fluid elements preferentially move within the reactor. Depending on the configuration of the reactor, the main flow direction can also differ locally, e.g. when plates are used within the reactor to guide the flow. The main flow direction in a reactor having an inlet and an outlet can, for example, be determined by means of a tracer. The tracer will move in the form of streams through the reactor. The main flow direction is given by the direction of movement of these streams.

Thus, for example, in a cylindrical reactor having an inlet and outlet at the opposite end faces of the cylinder, the cylindrical axis from inlet to outlet describes the main flow direction. In a shell-and-tube reactor having parallel tubes, the main flow direction is likewise aligned parallel to the tubes.

For the purposes of the present invention, the flow cross section is a plane perpendicular to the main flow direction. In the case of deflections in the reactor, the flow cross section can then sometimes also extend only over parts of the reactor.

The following examples illustrate the invention without limiting its scope.

EXAMPLES

Example 1

A three-dimensionally structured "cross-channel structure" as shown in FIG. 1 was produced from $\alpha$-$Al_2O_3$. The length is 50 mm and the diameter is 14 mm.

The basis for the body is granular aluminum oxide CT 3000 SDP (from Almatis, 67065 Ludwigshafen) which is mixed with a solid binder xanthan, 200 mesh (from König & Wiegand, 40472 Düsseldorf) by means of a Turbula mixer (Willy A. Bachofen A G, 4058 Basel, Switzerland). The proportion of solid binder is 10% by weight, based on aluminum oxide. The three-dimensional printing was carried out by means of a Z-Printer 310 (Z-Corporation, Burlington, Mass. 01803, USA) using a water-based binder solution ZB 54 (Z-Corporation, Burlington, Mass. 01803, USA). 2% by weight of the liquid binder was used. After printing, the parts were firstly dried at 60° C. for 8 hours and then blown free by means of compressed air. Ceramic firing was carried out at 1600° C. with a hold time of 2 hours.

Example 2

3.12 g of $Bi(NO_3)_3.5H_2O$ together with 3.36 g of $Pd(NO_3)_2.2H_2O$ and 48.6 mg of $Co(NO_3)_2.6H_2O$ are placed in a glass beaker. 18.17 g of distilled water and 9.08 g of concentrated nitric acid are added and the total mixture is stirred for 1 hour. Seven of the shaped $Al_2O_3$ bodies produced by rapid prototyping in example 1 and having a total mass of 42.8 g are placed in a Petri dish and the solution of the metal nitrates is added. The shapes are turned in the solution every 30 minutes and taken from the solution after 3 hours. The shapes are subsequently dried (120° C. for 4 hours) and calcined (heating at 2 K/min to 500° C., held at 500° C. for 10 hours). This gave 7 shapes having a total weight of 44.0 g and comprising 1.4% of Bi, 1.4% of Pd and 0.01% of Co.

Comparative Example 2

3.54 g of $Bi(NO_3)_3.5H_2O$ together with 3.81 g of $Pd(NO_3)_2.2H_2O$ and 55 mg of $Co(NO_3)_2.6H_2O$ are placed in a glass beaker. 30 g of distilled water and 15 g of concentrated nitric acid are added and the total mixture is stirred for 1 hour. This solution of the metal nitrates is added to 97 g of $Al_2O_3$ in the form of 1.5 mm extrudates having an average length in the range 5-10 mm. After impregnation, the shapes are dried (120° C. for 4 hours) and calcined (heating at 2 K/min to 500° C., held at 500° C. for 10 hours). This gave 98.2 g of extrudates comprising 1.5% of Bi, 1.5% of Pd and 0.011% of Co.

Example 3

50 ml of catalyst are installed in a salt bath reactor; a 10 ml layer of steatite is present as inert material at the top and at the bottom. The catalyst is brought to a temperature of 350° C. 120 standard l/h of nitrogen and 35 standard l/h of air are firstly passed over the catalyst, 15 minutes later 32.5 g/h of water are additionally added and a further 15 minutes later 22.4 g/h of cyclohexanone are added. The outputs are collected and the content of the desired reaction product cyclohexenone is determined by gas chromatography. The following table shows the results for the catalysts from example 2 and from comparative example 2 for three different temperatures.

|  | $m_{cat}$/g | Temp./° C. | Conversion/% | Selectivity/% | Yield/% |
|---|---|---|---|---|---|
| Example 2 | 32 | 350 | 59.6 | 59.4 | 35.4 |
|  |  | 370 | 65.1 | 51.5 | 33.5 |
|  |  | 390 | 68.4 | 43.3 | 29.6 |
| Comparative example 2 | 48 | 350 | 48.6 | 31.7 | 15.4 |
|  |  | 370 | 48.1 | 29.7 | 14.3 |
|  |  | 390 | 51.0 | 25.2 | 12.8 |

Conversion = conversion of cyclohexanone
Selectivity = selectivity to cyclohexenone
Yield = yield of cyclohexenone Despite a lower catalyst mass at comparable dopant contents, both a higher selectivity and a higher yield were found when using the catalyst according to the invention under identical reaction conditions. The yield was more than twice as high compared to the comparative example.

Example 4

Figure 2:
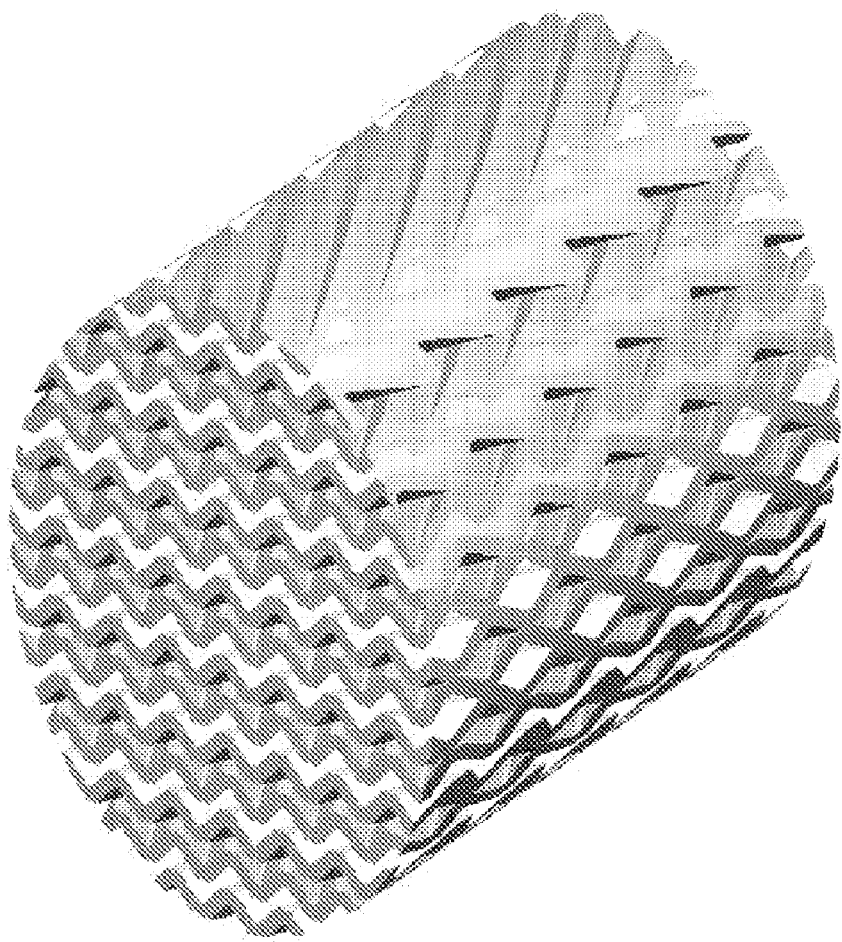
FIG. 2 shows a three-dimensionally structured "cross-channel structure" that was produced from $SiO_2$.

A three-dimensionally structured "cross-channel structure" as shown in FIG. 2 was produced from $SiO_2$. The length is 100 mm and the diameter is 80 mm.

Shaping by means of rapid prototyping was carried out on a ProMetal RCT S15 (from ProMetal RCT GmbH, 86167 Augsburg) by alternate application of powder and binder layers. Silica sand GS 14 (from Strobel Quarzsand GmbH, 92271 Freihung) having a particle diameter of 140 μm was used as powder and a furan resin acid mixture was used as binder. This binder mixture of Askuran 120 (from Ashland-Südchemie, 40721 Hilden) and RPT 100 (from Ashland-Südchemie, 40721 Hilden) was used in a mixing ratio of 100:40, with the resin being added to the powder and the hardener being introduced via the pressure head nozzles. Resin was added in an amount of about 1.5% to the powder. The shapes were produced by building up 47 layers and dried overnight at room temperature.

Example 5

The pressure drop which occurred when gas flowed through the shaped $SiO_2$ bodies produced by rapid prototyping in example 4 within a flow tube was measured. For comparison, the pressure drop in beds of $SiO_2$ extrudates (diameter: 1.5 mm; average length: 5 to 10 mm) was measured. For this purpose, the shaped bodies were installed in a stainless steel tube having a diameter of 80 mm or the $SiO_2$ extrudates were introduced as a fixed bed (bed height: 592 mm) and nitrogen was passed through the tube at 25° C. and atmospheric pressure at various flow velocities. The flow velocity was gradually increased and the pressure difference over the reactor internals or the bed was measured by means of pressure sensors (NetScanner 9116, from Esterline Pressure Systems, pressure range up to 100 kPa). To evaluate the results, the pressure drop over the height of the reactor internals or the bed was plotted as a function of the superficial velocity.

The following table shows the pressure drops determined for the structured shaped bodies compared to the $SiO_2$ extrudates for three selected flow velocities.

|  | Δp/H [mbar/m] | | |
|---|---|---|---|
| Superficial velocity [m/s] | 0.1 | 1 | 10 |
| Shaped $SiO_2$ bodies | 0.2 | 4.7 | 280 |
| $SiO_2$ extrudates | 16 | 300 | 2000 |

It can be seen that the structured $SiO_2$ bodies produced by rapid prototyping give a significantly lower pressure drop than the catalyst bed composed of 1.5 mm extrudates.

Example 6

A three-dimensionally structured "cross-channel structure" composed of $\alpha$-$Al_2O_3$ as shown in FIG. 2 was produced. The length is 50 mm and the diameter is 80 mm.

The basis for the body is granular aluminum oxide CT 3000 SDP (from Almatis, 67065 Ludwigshafen) which is mixed with a solid binder xanthan, 200 mesh (from König & Wiegand, 40472 Düsseldorf) by means of a Turbula mixer (Willy A. Bachofen AG, 4058 Basel, Switzerland). The proportion of solid binder is 10% by weight, based on aluminum oxide. The three-dimensional printing was carried out by means of a Z-Printer 310 (Z-Corporation, Burlington, Mass. 01803, USA) using a water-based binder solution ZB 54 (Z-Corporation, Burlington, Mass. 01803, USA). 2% of the liquid binder was used. After printing, the parts were firstly dried at 60° C. for 8 hours and then blown free by means of compressed air. Ceramic firing was carried out at 1600° C. with a hold time of 2 hours.

The invention claimed is:
1. A process for the preparation of shaped bodies having catalytic properties as reactor internals in heterogeneously catalyzed chemical reactions comprising the steps:
   a) production of a shaped body by means of a powder-based rapid prototyping process, of the following steps which are repeated until the desired shaped body has been built up completely from the individual layers: Applying a pulverulent starting material or starting material mixture having an average particle size in the range from about 0.5 μm to about 450 μm in a thin layer to a substrate and subsequently admixing at selected places on this layer with a binder and any auxiliaries required or irradiating or treating in another way so that the powder is bonded at these places, as a result of which the powder is bound both within the layer and also to the adjoining layers, repeating this procedure as often as necessary for the desired shape of the workpiece to have been reproduced completely in the powder bed formed, removing the powder which has not been bound by the binder to leave the bound powder in the desired shaped body, b) a heat treatment of the shaped body in the format sintering and/or calcination, wherein firstly binder removal can be carried out, c) application of at least one catalytically active component to the shaped body, and d) if appropriate, a further heat treatment, where steps b), c) and/or d) can be carried out a number of times.

2. The process according to claim 1, wherein a binder or binder mixture selected so that it itself or its residues do not affect or do not adversely affect the chemical reaction in the later use as catalyst (support) is used in step a).

3. The process according to claim 2, wherein a sol or a colloidal solution of silicon dioxide or aluminosilicates, silica, silicic esters, siloxanes or silicones or a water-based liquid binder with addition of vinyl polymers or other wetting agents is used as binder in step a).

4. The process according to claim 2, wherein the shaped bodies are made up of silicon dioxide, aluminum oxide, titanium dioxide, zirconium dioxide, magnesium oxide, calcium oxide, mixed metal oxides, hydrotalcites, spinels, Perovskites, metal phosphates, silicates, zeolites, steatite, cordierite, carbides, nitrides or mixtures or blends thereof.

5. The process according to claim 2, wherein a pulverulent starting material having an average particle size in the range from 1 µm to 450 µm is used in step a).

6. The process according to claim 2, wherein the heat treatment in step b) is carried out as a calcination at temperatures in the range from 350 to 2100° C.

7. The process according to claim 1, wherein a sol or a colloidal solution of silicon dioxide or aluminosilicates, silica, silicic esters, siloxanes or silicones or a water-based liquid binder with addition of vinyl polymers or other wetting agents is used as binder in step a).

8. The process according to claim 7, wherein the shaped bodies are made up of silicon dioxide, aluminum oxide, titanium dioxide, zirconium dioxide, magnesium oxide, calcium oxide, mixed metal oxides, hydrotalcites, spinels, Perovskites, metal phosphates, silicates, zeolites, steatite, cordierite, carbides, nitrides or mixtures or blends thereof.

9. The process according to claim 7, wherein a pulverulent starting material having an average particle size in the range from 1 µm to 450 µm is used in step a).

10. The process according to claim 1, wherein the shaped bodies are made up of silicon dioxide, aluminum oxide, titanium dioxide, zirconium dioxide, magnesium oxide, calcium oxide, mixed metal oxides, hydrotalcites, spinels, Perovskites, metal phosphates, silicates, zeolites, steatite, cordierite, carbides, nitrides or mixtures or blends thereof.

11. The process according to claim 10, wherein a pulverulent starting material having an average particle size in the range from 1 µm to 450 µm is used in step a).

12. The process according to claim 1, wherein a pulverulent starting material having an average particle size in the range from 1 µm to 450 µm is used in step a).

13. The process according to claim 1, wherein the heat treatment in step b) is carried out as a calcination at temperatures in the range from 350 to 2100° C.

14. The process according to claim 1, wherein the powder used in step a) has been subjected to a pretreatment comprising at least one of the steps milling, sieving, calcination, granulation, compacting, mixing, and agglomeration.

15. The process according to claim 1, wherein the shaped bodies have channels through which a reaction medium flows and which are inclined to the main flow direction at an angle in the range from 0° to 70°.

16. The process according to claim 1, wherein the shaped bodies are configured as multichannel packings which have channels in which the chemical reaction preferentially takes place and additionally comprise channels in which convective heat transport preferentially takes place, with the channels for heat transport preferably being inclined at a greater angle and preferably having a hydraulic diameter which is 2-10 times the diameter of the channels for catalysis.

17. The process according to claim 16, wherein the shaped bodies are configured as multichannel packings whose individual layers are perforated to achieve better mass transfer.

18. The process according to claim 16, wherein the channels for heat transport are inclined at a greater angle than the channels for catalysis.

19. The process according to claim 16, wherein the channels for heat transport have a hydraulic diameter which is 2-10 times the diameter of the channels for catalysis.

20. The process according to claim 16, wherein the shaped bodies have channels through which a reaction medium flows and which are inclined to the main flow direction at an angle in the range from 30° to 60°.

* * * * *